(12) United States Patent
Uomini

(10) Patent No.: US 9,177,264 B2
(45) Date of Patent: Nov. 3, 2015

(54) MANAGING MESSAGE CATEGORIES IN A NETWORK

(75) Inventor: Robert Uomini, Kensington, CA (US)

(73) Assignee: CHIARAMAIL, CORP., Kensington, CA (US)

( * ) Notice: Subject to any disclaimer, the term of this patent is extended or adjusted under 35 U.S.C. 154(b) by 0 days.

(21) Appl. No.: 12/399,134

(22) Filed: Mar. 6, 2009

(65) Prior Publication Data

US 2010/0228812 A1  Sep. 9, 2010

(51) Int. Cl.
*G06F 15/16* (2006.01)
*G06Q 10/00* (2012.01)
*H04L 12/58* (2006.01)

(52) U.S. Cl.
CPC .............. *G06Q 10/00* (2013.01); *H04L 12/585* (2013.01)

(58) Field of Classification Search
CPC ........................... G06Q 10/107; H04L 12/585
USPC .................................................. 709/206, 204
See application file for complete search history.

(56) References Cited

U.S. PATENT DOCUMENTS

| | | |
|---|---|---|
| 5,095,480 A | 3/1992 | Fenner |
| 5,333,266 A | 7/1994 | Boaz et al. |
| 5,418,908 A | 5/1995 | Keller et al. |
| 5,544,360 A | 8/1996 | Lewak et al. |
| 5,548,753 A | 8/1996 | Linstead et al. |
| 5,572,643 A | 11/1996 | Judson |
| 5,617,565 A | 4/1997 | Augenbraun et al. |
| 5,619,648 A | 4/1997 | Canale et al. |
| 5,649,186 A | 7/1997 | Ferguson |
| 5,790,793 A | 8/1998 | Higley |
| 5,793,972 A | 8/1998 | Shane |
| 5,813,008 A | 9/1998 | Benson et al. |
| 5,815,663 A | 9/1998 | Uomini |
| 5,819,269 A | 10/1998 | Uomini |
| 6,018,761 A | 1/2000 | Uomini |
| 6,044,395 A | 3/2000 | Costales et al. |
| 7,020,779 B1 | 3/2006 | Sutherland |
| 7,117,246 B2 | 10/2006 | Christenson et al. |
| 7,257,645 B2 | 8/2007 | Wiser et al. |
| 7,328,244 B1* | 2/2008 | Kelley ........................ 709/206 |
| 7,996,511 B1 | 8/2011 | Wiese et al. |
| 8,145,715 B2 | 3/2012 | Henry et al. |
| 8,619,800 B1 | 12/2013 | Finney et al. |
| 8,635,292 B2 | 1/2014 | Uomini |
| 2002/0112008 A1 | 8/2002 | Christenson et al. |
| 2002/0143885 A1 | 10/2002 | Ross |
| 2003/0126215 A1 | 7/2003 | Udell et al. |
| 2004/0015413 A1 | 1/2004 | Abu-Hejleh et al. |
| 2004/0117451 A1* | 6/2004 | Chung ......................... 709/207 |
| 2005/0066236 A1* | 3/2005 | Goeller et al. .................. 714/39 |
| 2005/0144572 A1* | 6/2005 | Wattenberg et al. .......... 715/822 |
| 2006/0003743 A1 | 1/2006 | Moody et al. |
| 2006/0085504 A1* | 4/2006 | Yang et al. .................... 709/206 |

(Continued)

OTHER PUBLICATIONS

"James Server", downloaded from http://www.apache.org/ on Dec. 30, 2011; 19 pages.

(Continued)

*Primary Examiner* — Dustin Nguyen
*Assistant Examiner* — Joel Mesa
(74) *Attorney, Agent, or Firm* — Mintz Levin Cohn Ferris Glovsky and Popeo, P.C.

(57) ABSTRACT

A method for creating and assigning categories to electronic messages and detecting the categories for a given message when the message becomes available to the recipient.

42 Claims, 12 Drawing Sheets

(56) References Cited

U.S. PATENT DOCUMENTS

| | | | |
|---|---|---|---|
| 2006/0149822 A1 | 7/2006 | Henry et al. | |
| 2007/0073839 A1 | 3/2007 | Chung et al. | |
| 2007/0124312 A1* | 5/2007 | Simpson et al. | 707/10 |
| 2007/0238936 A1 | 10/2007 | Becker | |
| 2009/0325609 A1* | 12/2009 | Rosen et al. | 455/466 |
| 2010/0287372 A1 | 11/2010 | Welin et al. | |
| 2011/0016185 A1 | 1/2011 | Zwaal et al. | |
| 2012/0296990 A1 | 11/2012 | Uomini | |
| 2013/0159388 A1 | 6/2013 | Forsman et al. | |

OTHER PUBLICATIONS

"vCard the Electronic Business Card Version 2.1. A versit Consortium Specification" Sep. 18, 1996, pp. 1-6, located at http://www.versit.com/pdi/vcrdwht.html.

"What is LiveForm?,"© 1996 Patil Systems, Inc., 1 page, located at http://www.patils.com/liveform.htm. Oct. 14, 1997. Web. WayBack Machine. [Retrieved May 29, 2015].

Brown, Mark R. "Special Edition Using Netscape 2" (2d ed.), pp. 197-211, 1995.

Brown, Mark R. "Special Edition Using Netscape 2" (2d ed.), pp. 334, 337-341, 1995.

Dawson F., Howes, T., "An Application/Directory MIME Content-Type Electronic Business Card." (Jun. 1996) pp. 1-21, located at http://ds.internic.net/internet-drafts/ draft-ietf-asid-mime-vcard-00.txt.

Horton, M., Adams, R. "Standard for Interchange of USENET Messages." Network Working Group. Request for Comments: 1036. AT&T Bell Laboratories. Center for Seisnic Studies. Located at http://www.pmg.lcs.mitedu/cgi-bin/rfc/view?number=1036.(Dec. 1987):pp. 1-19.

International Search Report and Written Opinion, mailed Jul. 16, 2012, of the ISA for International Application PCT/US12/36694 filed May 5, 2012. 8 pages.

The Computer Information Centre (Compinfo). http://ww-w.compinfo.co.uk/info-me.htm, 1996-98. Web. Wayback Machine. [Retrieved May 29, 2015].

Woods, Greg. "How to Create a New Usenet Newsgroup," http://www.cis.ohio—state.edu/hypertext/faq/usenet/creating—newsgroups/partl/faq.html, Jun. 13, 1996, pp. 1-3. Web. Apr. 28, 1999. Last change Jan. 31, 1997. WayBack Machine. [Retrieved May 29, 2015].

* cited by examiner

Figure 6

MANAGING MESSAGE CATEGORIES IN A NETWORK

BACKGROUND OF THE INVENTION

1. Field of the Invention

This invention pertains to the field of exchanging messages on computer networks such as the Internet.

2. Description of Related Art

Social networking on the Internet began with the advent of e-mail, continued with the development of Usenet (online bulletin boards), Web posting networks, including blogs, Internet Relay Chat (IRC) and other interactive chat systems, and has since evolved into what has been termed "walled gardens": distinct online communities whose participants are typically paying members who are given access to the resources of the community for the purpose of engaging in social discourse with other members. Resources include the means of posting and viewing photos and videos, messaging with other members, posting comments, and so on. Facebook, MySpace and the various online dating sites, such as Match.com and Yahoo! Personals, are examples of social networks. Members of a given community generally cannot interact with members of other online communities without becoming a member of the other community, hence the term "walled garden".

Some communities, such as many of the online dating sites, are used primarily as filters: members provide a set of personal data, such as age, sex, occupation, income, hobbies, etc., as well as search criteria and the site matches personal— with search criteria, sending e-mail of the various "matches", along with a relative ranking of each match, to their members. The matching and ranking are done at the site and the member receives the results in an e-mail message.

The above messaging scheme maintains the "walled garden" paradigm in its dependence or the site for providing the matching and ranking, as well as a lack of interoperability with other, similar sites. Furthermore, the scheme has a static nature to it: once a message is received, changes in the search criteria by the recipient do not result in ranking changes in messages which had already been sent: one's only option is to submit the changes in the search criteria to the site and wait for it to perform filtering and, perhaps, send some new matches. Worse yet, the recipient of a message indicating, say, a high percentage of commonality between his or her search criteria and another member's personal data, usually has no way of knowing exactly where the commonality is without making extra effort. Also, the categories which make up the filters are fixed; the user has no latitude in creating or propagating his or her search categories.

Among social networks as a whole, one common shortcoming stands out: namely, the inability of the network to provide a mapping of message sender characteristics with message viewer filters. In the case of Usenet, one invention, described in U.S. Pat. No. 5,819,269, attempted to alleviate this shortcoming. However, the invention only applied to Usenet and did not provide any level of privacy to the message sender's characteristics. The present invention provides the mapping described for messages sent anywhere in the entire Internet and is applicable to a broad class of social networks.

SUMMARY OF THE INVENTION

The invention overcomes the limitations of existing social networking methodologies by freeing the participants from dependence on a particular site and allowing them to define their own categories, decide which categories may be made public and which are to remain private, construct groups of categories for a given social- or business setting and decide, even among public categories that may be part of a given category group, which message recipients are permitted to filter on the sender's group.

Groups of categories are assigned to outbound messages as part of the sender's sending configuration; a given message may have one or more category groups assigned to it and each group, as mentioned above, may be given its own privacy control (list of recipients who are permitted to detect the groups in the sender's message). Typically, all outbound messages are assigned the same, fixed set of category groups; only the respective privacy controls govern which groups are visible to which Recipients, so the user need not configure different groups for different messages. Categories may be embedded in the message, say, in a header area, or may reside in a database managed by a "category server" and fetched via commands sent by the recipient's client program to the server. If embedded in the message, the groups would then be visible to all recipients of the message and privacy controls would, in that case, not apply.

Message recipients who were granted permission by the sender to filter on a given group may be provided with visual feedback indicating exactly which of their filters match with which categories for a given message. Thus, electronic messages are now provided with a "personality" by their senders. When used with social networks that make use of avatars, the avatars of the message sender, rather than or in addition to the messages sent by the sender, may be provided with the personality described above. At any time, the recipient may change his filters, with the change (if any) reflected immediately in the received message or avatar.

BRIEF DESCRIPTION OF THE DRAWINGS

These and other more detailed and specific objects and features of the present invention are more fully disclosed in the following specification, reference being had to the accompanying drawings, in which:

FIG. 6 is a screenshot showing the user's selection of Sending Options.

PREFERRED IMPLEMENTATION

Figure 1:
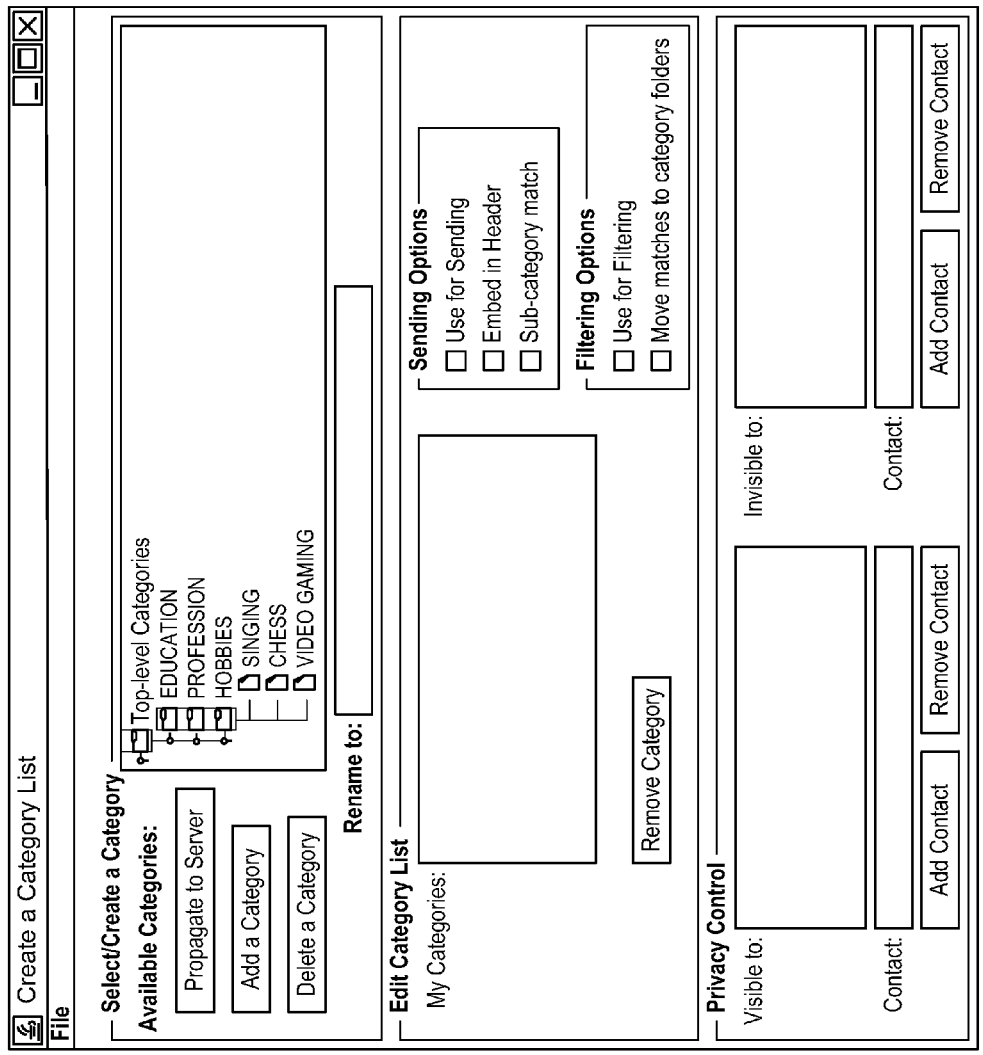
FIG. 1 is a screenshot showing a computer user setting up a list of currently available categories for use in the present invention, plus a new category (video gaming) created by the user and not currently publicly available.

The preferred implementation includes a messaging client, such as an e-mail program, and a category server. The following sections respectively describe the operation of the two components.

I. Messaging Client

After the client software is started, it attempts to make a socket connection to the category server, based on previously-established parameters (category server name or IP address and category server port number). Once it has established a connection with the server, it sends a LOGIN request, providing the user's e-mail address and a password. Both e-mail address and password are stored at the server, which authenticates the user. If authentication succeeds, the client may then send other requests to the server; if not, the connection is broken and may later be re-established, followed by another LOGIN attempt.

Assuming the client has successfully logged into the server, it immediately uploads its category groups file to the server; This file contains all the category groups which the user had previously created (see Configuration and Operation, below), as well as a list of the user's private categories (categories that have not been made public but which may be used by a message recipient as part of the recipient's filter). The server assigns the received file to the client and references the file whenever client requests from mail recipients are received that require information in the file.

For each mail message received by the client, a search is made in the mail header for a field X-ChiaraMail-Category. If any are found, they are sequentially checked for a match with the client's category filters. If there is a match, a "match count" is incremented. Optionally, the message is copied to one or more "category" folders, each of which may be part of a folder hierarchy and corresponding to the categories in questions. For example, if a message contains the mail headers X-ChiaraMail-Category: Hobbies: Chess and X-ChiaraMail-Category: Profession: Programmer: Java, the message would be copied to folders named Chess and Java. The Chess folder would be inside the Hobbies folder and the Java folder would be inside the Programmer folder, which would be contained in the Profession folder. The folder hierarchy would be visible to the user, thus showing the entire category hierarchy of the message, for each category. When a message header (a line displayed by the mail client and typically showing the message subject, sender and date received, not to be confused with the mail header, which is a field value) is displayed by the mail client, it is rendered in a color corresponding to the match count, for example, by using the count as an index into a color table.

Next, regardless of whether the message had contained any X-ChiaraMail-Category fields, a request is sent to the server to determine the number of matches of the message's categories with the user's filters. In the request, the client provides, for each category in its filter, the category and the sender e-mail address; the server returns a (possibly empty) list of matching categories. The client increments the match count by 1 for each category in the returned list. After processing all the categories in its filter, the client again renders the messages in the colors corresponding to their respective match count and optionally copies them to their corresponding category folders.

If the client had, as part of its filtering options, indicated that matching messages are to be copied to their corresponding category folder(s), as described above, the folder is created, if it doesn't already exist, and the message is copied to it. Whenever a category groups file is changed, the category folder hierarchy is rebuilt, using the new match information.

II. Category Server

The category server not only responds to client request as described above, but also, via its authentication mechanism, ensures that requests sent by clients would be processed only if the client has completed the login process. The server also enforces the privacy controls defined in the users' category groups files, by returning match results only to clients who the sender has authorized (see Configuration and Operation, below).

The server supports the following requests:

LOGIN <e-mail addr> <password>, where <e-mail addr> is the client user's e-mail address and <password> is a password that had been previously assigned to the user. The client initiates the request and the server responds, indicating success or not.

ADD CATEGORIES <categories>, where <category> is a #-delimited list of categories. The server responds with a code indicating success, whether or not one or more categories had already been uploaded earlier, or error.

GET-UPDATES returns a complete copy of the public categories file and is sent once per day.

UPLOAD FILE <file-data>, where <file-data> is the contents of the user's category groups file, described in Configuration and Operation, below. The server uses this file for processing the GET MATCH request.

GET MATCHES <filter> <e-mail addr>, where <filter> is a single category from the client's filter and <e-mail addr> is the e-mail address of the mail sender. Typically, the client will send several GET MATCHES requests, one for each category in his active filters. The server returns a list of matches. Note that the list returned may include more than one category: for example, if the user filter is Hobbies: Board Games, if the mail sender assigned the categories of Hobbies: Board Games: Scrabble and Hobbies: Board Games: Monopoly to his message, GET MATCHES will return two matches.

III. Configuration and Operation

The steps in configuring the categories to be assigned to outbound mail (sending categories) and to filters are as follows:

1. Select the categories that will be used, either when sending the message or filtering. This step may involve the creation of new categories (FIG. 1). In FIG. 1, the user has created a private category, Video Gaming, which, in the original screenshot, is outlined in blue to distinguish it from the public categories, which are outlined in red.

Figure 2:
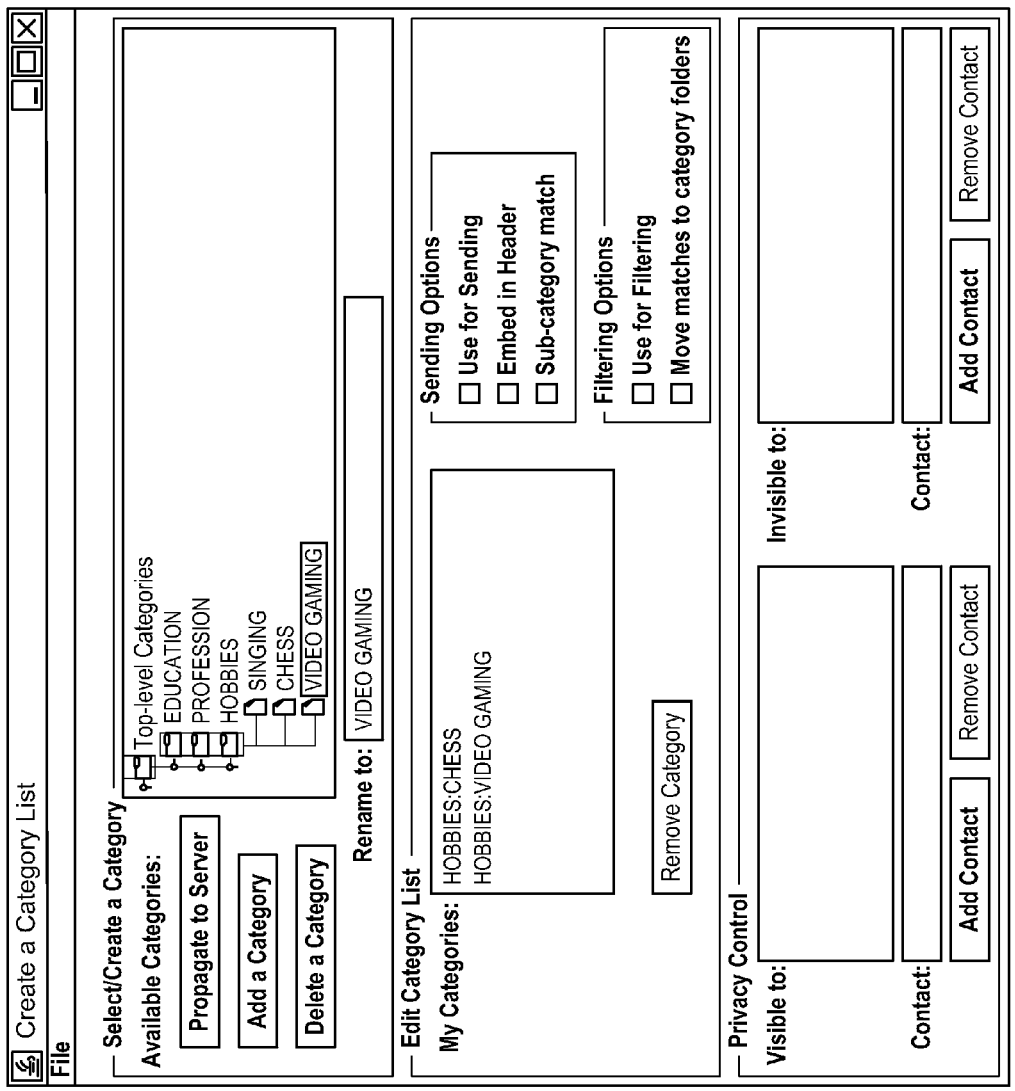
FIG. 2 is a screenshot showing that the user has dragged some of the categories to the "My Categories" window.

2. After creating the needed categories, the user drags some of them from the top-most window into the middle window (FIG. 2).

Figure 3:
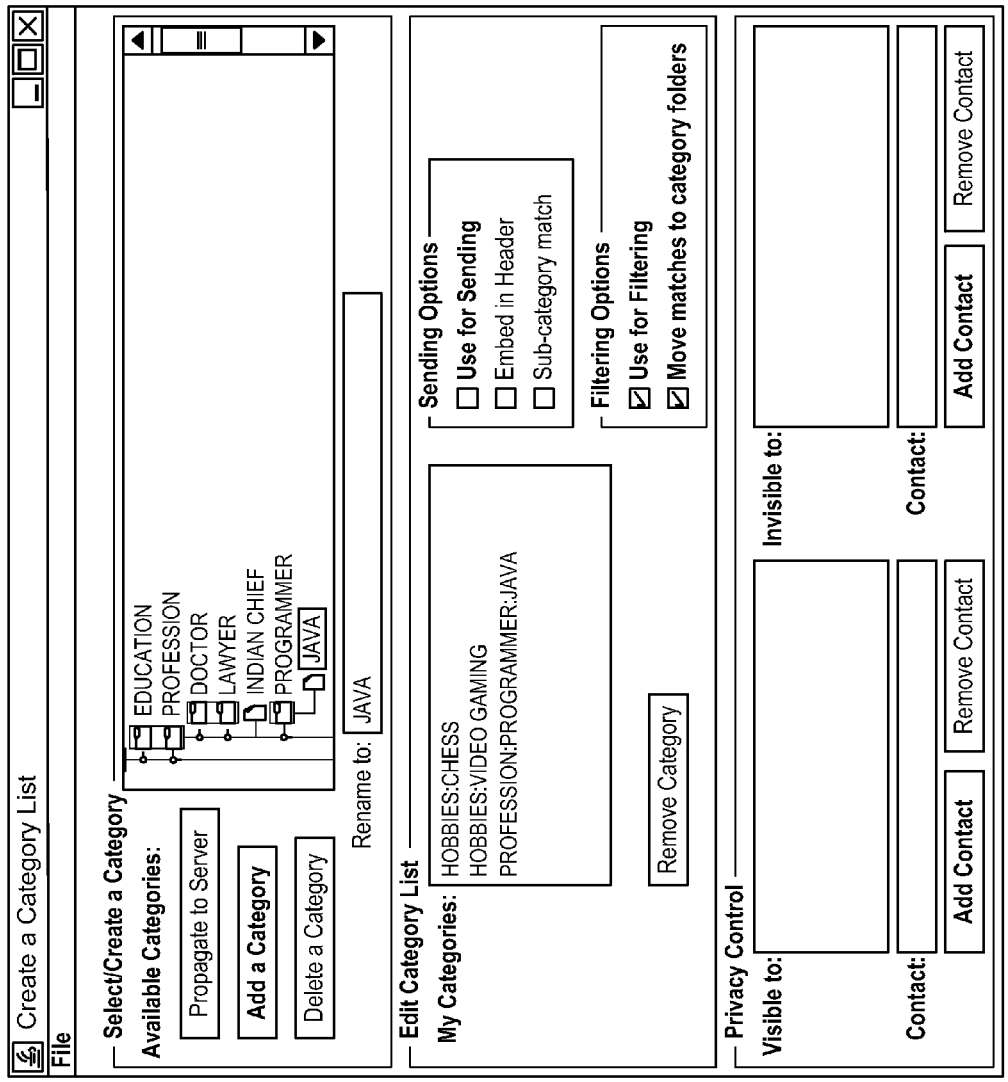
FIG. 3 is a screenshot showing the Filtering Options that the user has selected.

3. The user has created a group consisting of three categories, which he will use for filtering but which will not be included in his outbound mail. He therefore deselects the sending options. He wants e-mail that he receives that matches his filter to be copied to a set of folders identifying the sender's categories, so he checks the box labeled Move matches to category folders (FIG. 3).

Figure 4:
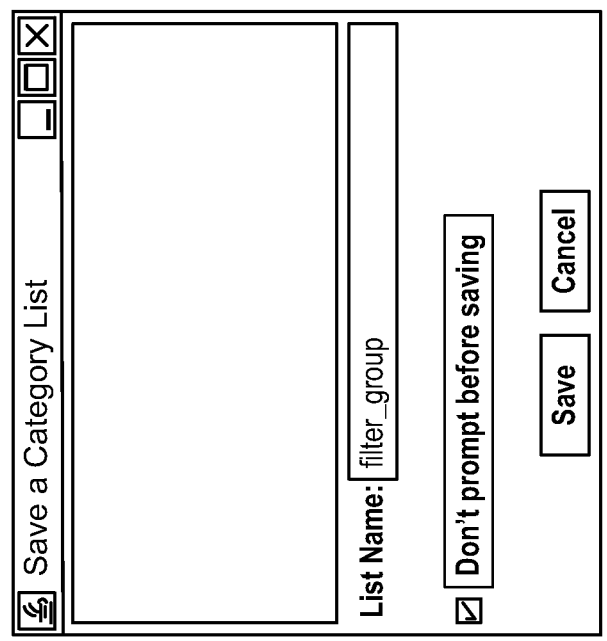
FIG. 4 is a screenshot showing the user has saved his or her configuration with the group name "filter_group".
Figure 5:
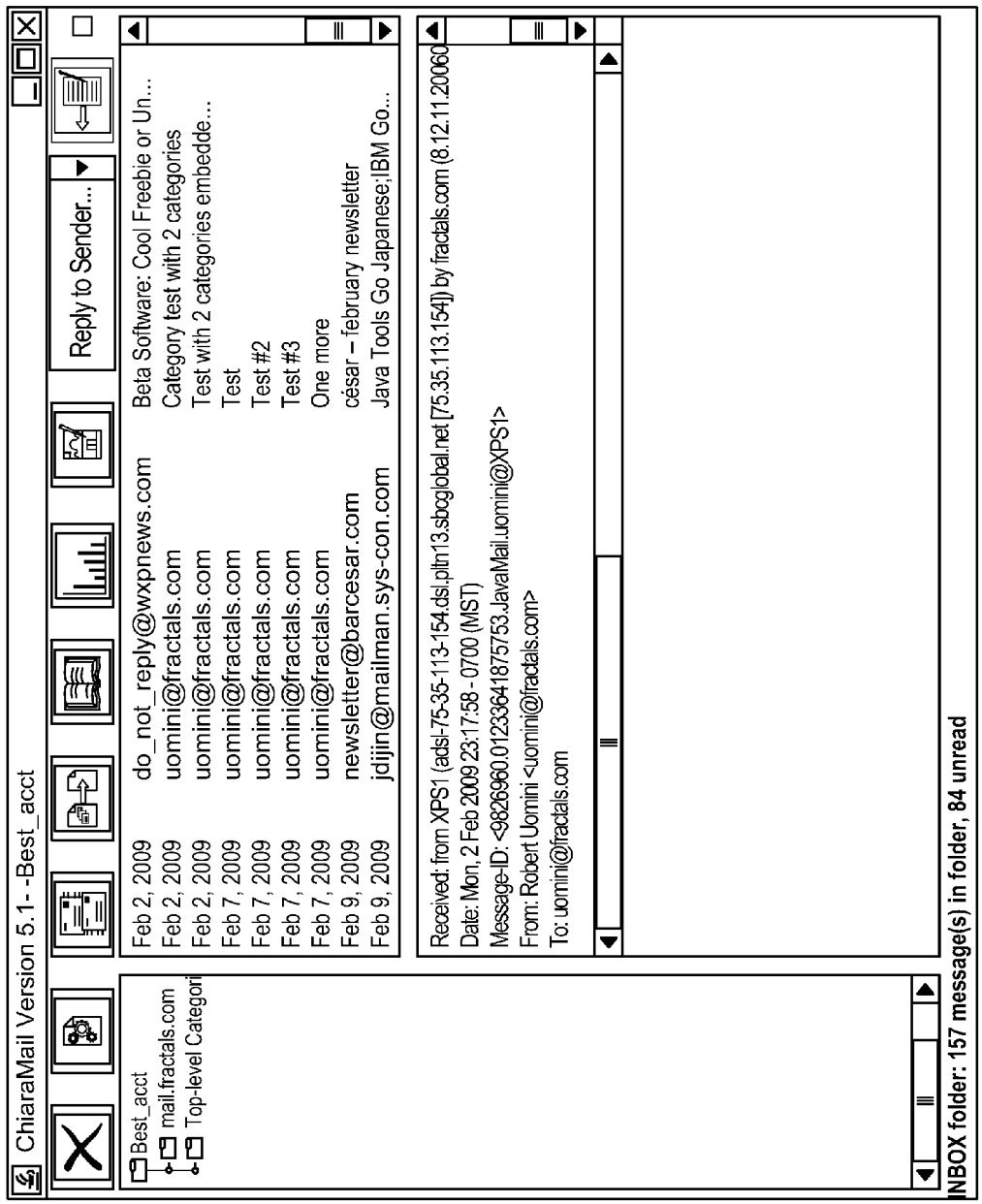
FIG. 5 is a screenshot of a user's computer display showing a list of incoming message headers.

4. Next, the configuration is saved, with a group name of filter group (FIG. 4).
5. Now note the color in which the mail message headers are displayed (FIG. 5). The colors reflect the degree to which the sender's categories match the recipient's filters; in this case, two messages have the same number of matches, while three others are different from the other two. In FIG. 5, the message header window contains nine entries (lines). In the original color screenshot that is the basis for the black and white version of FIG. 5 that is presented in this patent application, the first, second, eighth, and ninth lines are rendered in black. The third and sixth lines are rendered in red. The fourth line is rendered in yellow. The fifth line is rendered in pink. And the seventh line is rendered in blue. The two lines that have the same number of matches are the third and the sixth lines, because they are both rendered in the same color (red). The three other lines (lines four, five and seven) that are not rendered in red or black have a different number of matches than the two red lines.

The alert reader may notice that although we had created a filter containing three categories, we hadn't specified any categories for outbound messages, so why are any messages flagged?

The reason is that the messages that appear in color are those in which message categories had been embedded in the message prior to sending. So even though we hadn't explicitly associated categories for outbound messages, the mail client counted those in the header. For example, look at the first message that is rendered in red (on message line 3), and notice the mail headers marked X-ChiaraMail-Categories. One specifies Hobbies: Chess and the other, Profession: Doctor: Pediatrician. Since Hobbies: Chess is one category we are filtering on, while Profession: Doctor: Pediatrician was not included in our filter, we end up with 1 match.

Figure 6:
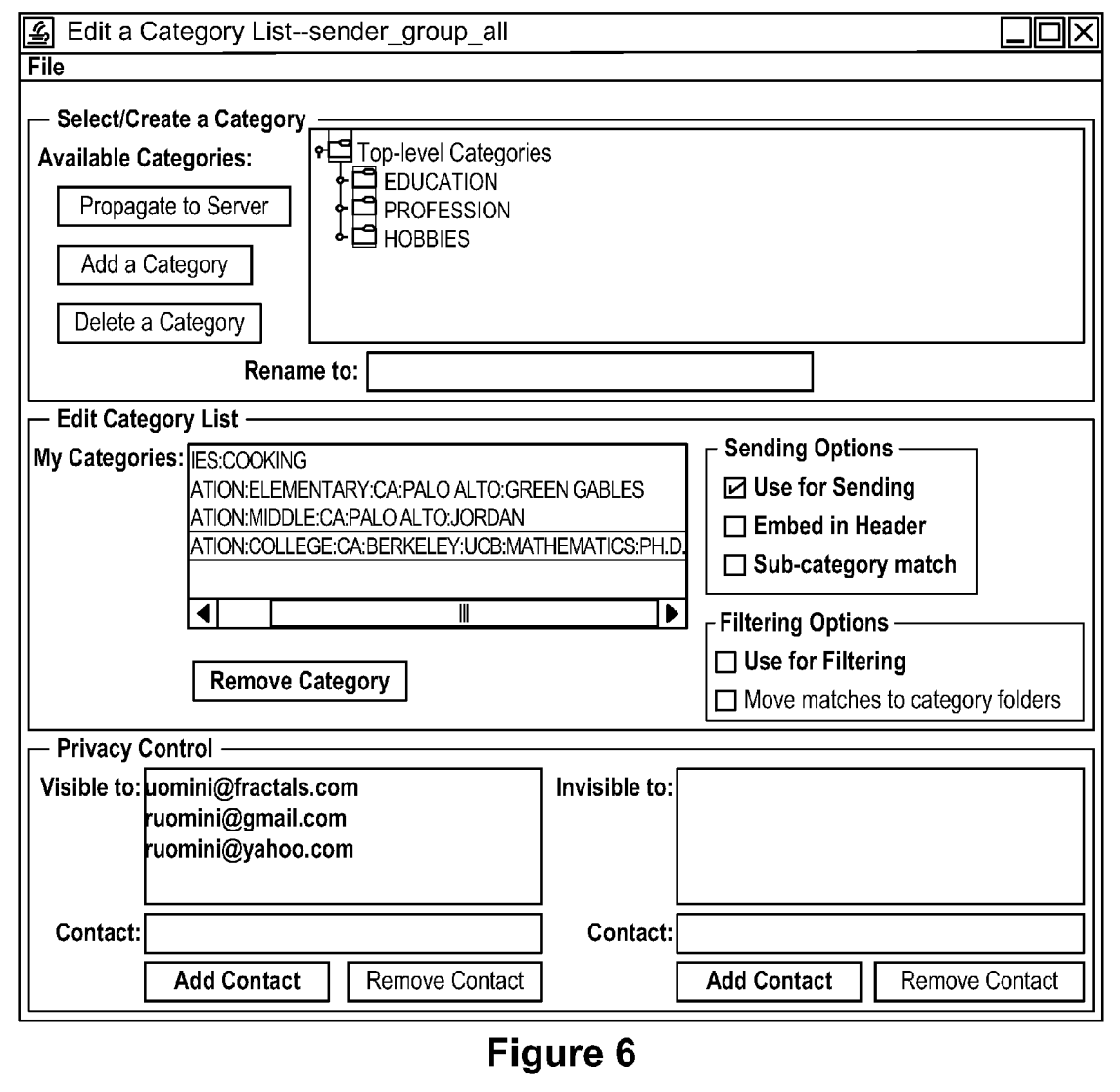

6. Create a sending configuration as in FIG. 6. Note that under Sending Options, the box Use for Sending is checked but Embed in Header is not checked. This means that the four message categories appearing in the My Categories list will not appear anywhere in the actual e-mail message and will only be apparent to one of three recipients (those listed in the Visible to list) and only when the recipients view the message.

Figure 7:
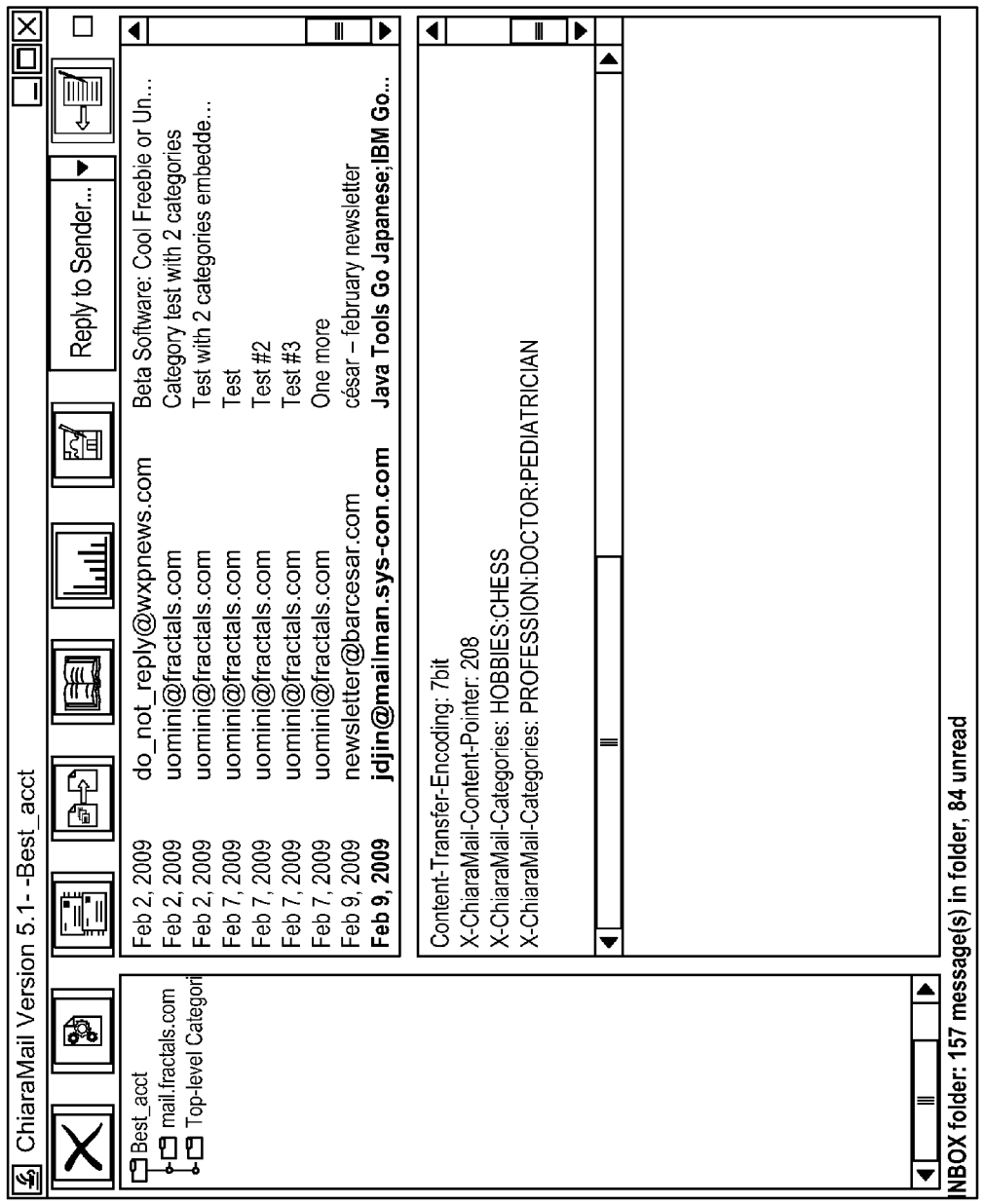
FIG. 7 is a screenshot showing the list of incoming message headers. Colors of the message headers have changed from their FIG. 5 instantiation in response to a changed configuration, as described herein.

Save the sending configuration with a group name of sender_group_all and note the change in the main window (FIG. 7). There are nine lines in the message header window. In the original color screenshot that is the basis for the black and white version of FIG. 7 that is presented in this patent application, the first, eighth, and ninth lines are rendered in black; the second, third, fifth, and sixth lines are rendered in yellow; the fourth line is rendered in green; and the seventh line is rendered in purple.

Figure 8:
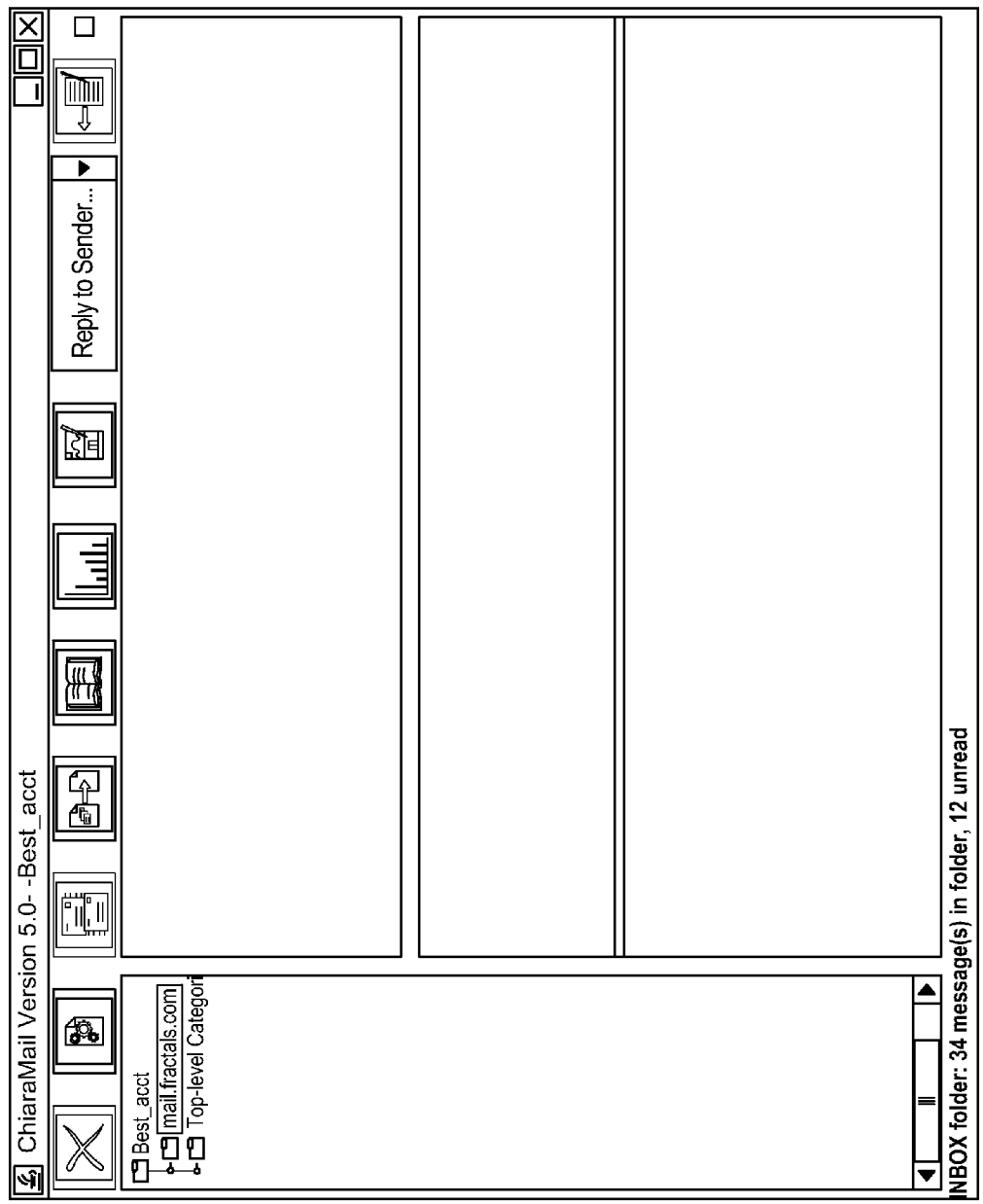
FIG. 8 is a screenshot showing no entries in the window that displays incoming message headers. This is because something other than a message category was selected in the left-hand window. Selecting a category causes all the subject lines for messages that contain that category to be displayed.
Figure 9:
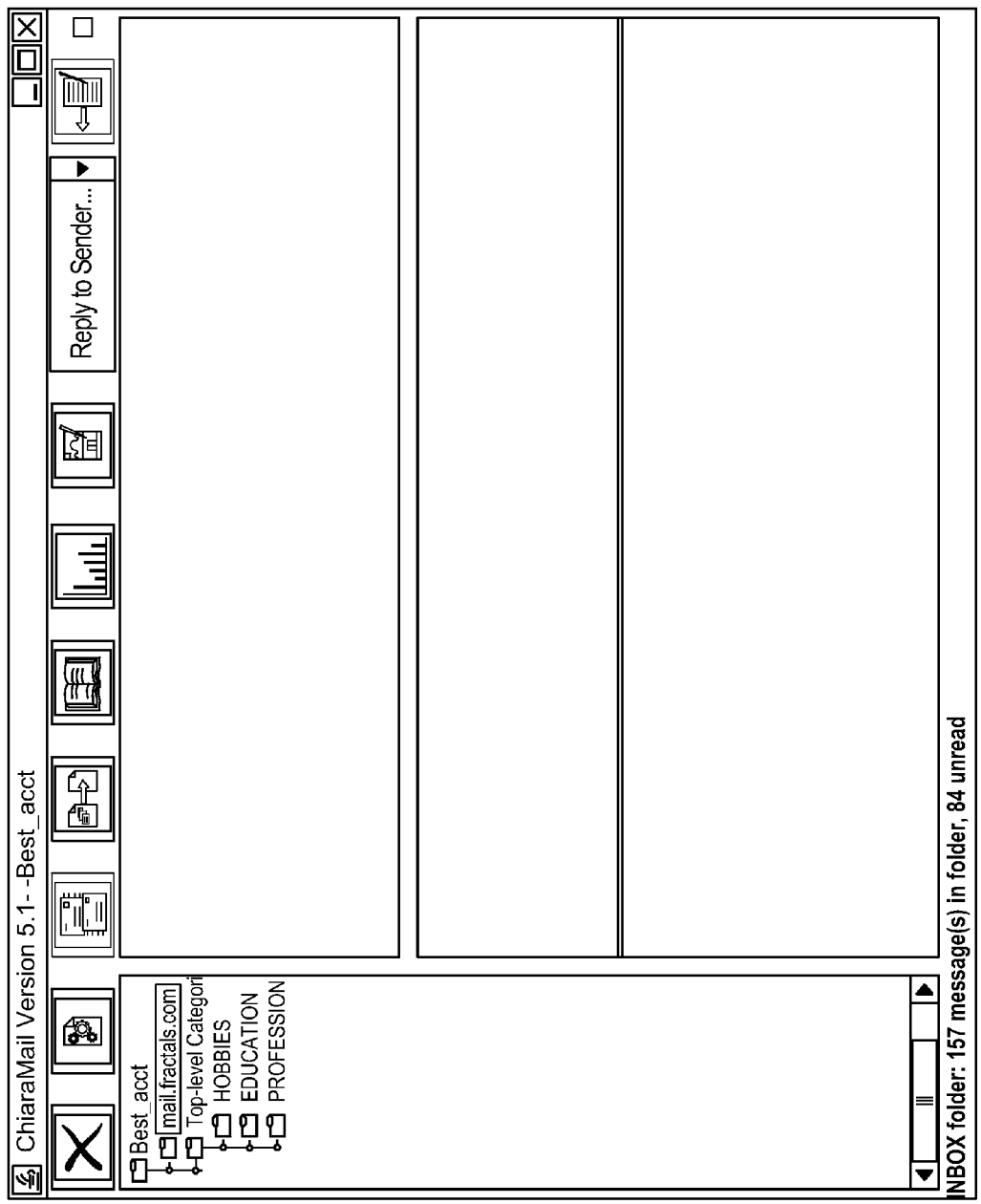
FIG. 9 is a screenshot showing that the user has opened the folder entitled "Top-level Categories".
Figure 10:
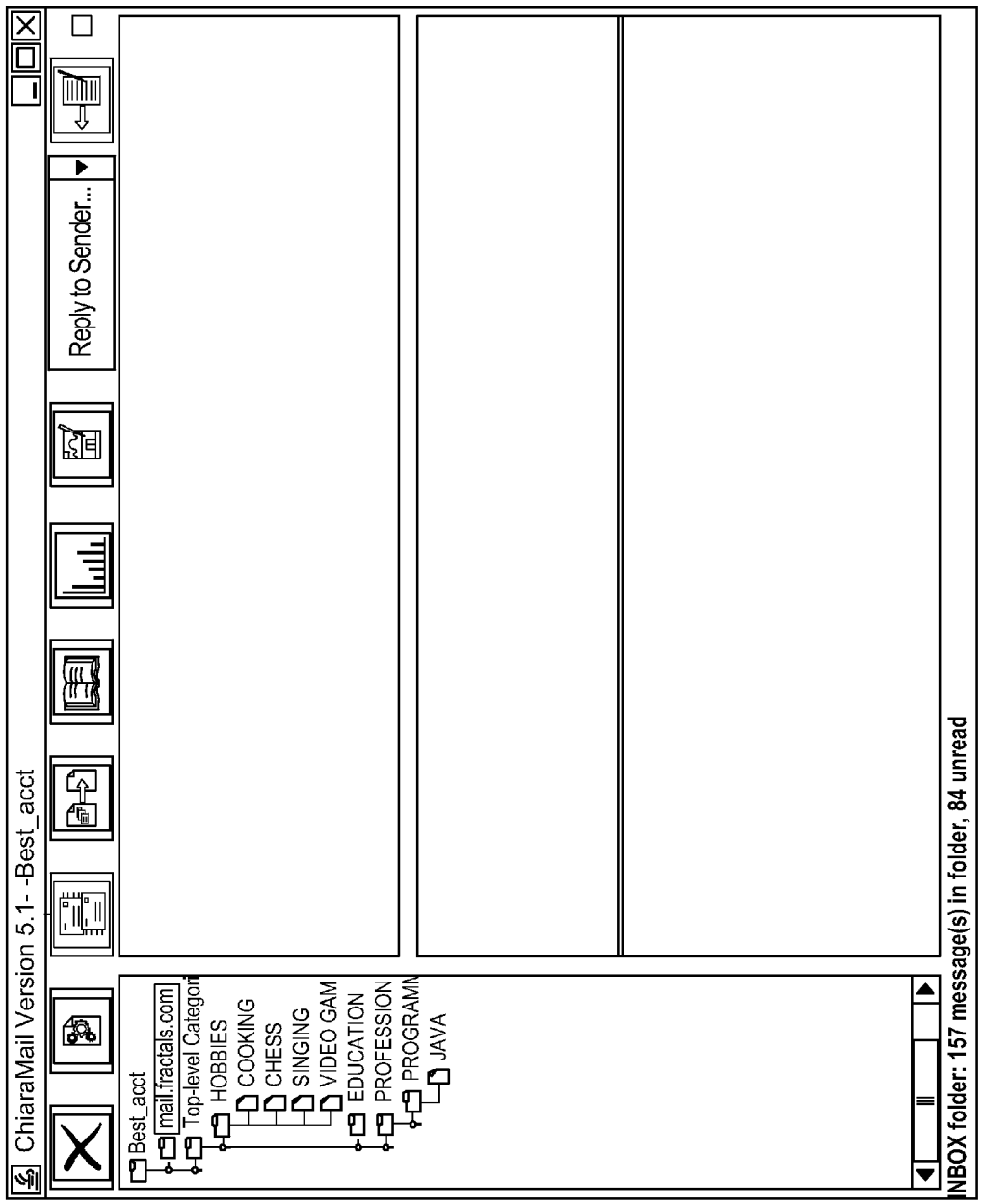
FIG. 10 is a screenshot showing what is displayed when the user has opened the folders entitled "HOBBIES", "PROFESSION", and "PROGRAMMING".
Figure 11:
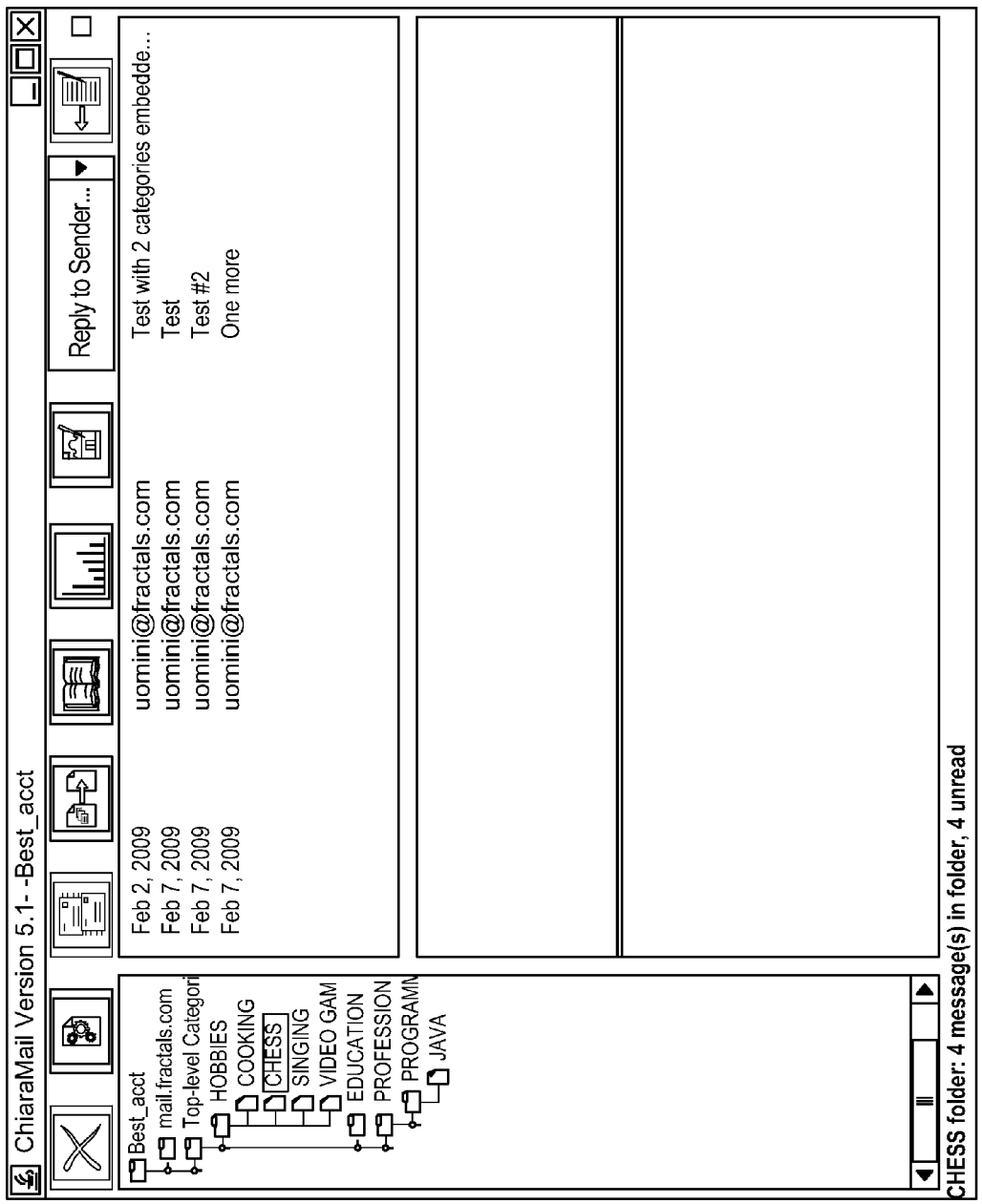
FIG. 11 is a screenshot showing that the user has selected the category labeled "CHESS".
Figure 12:
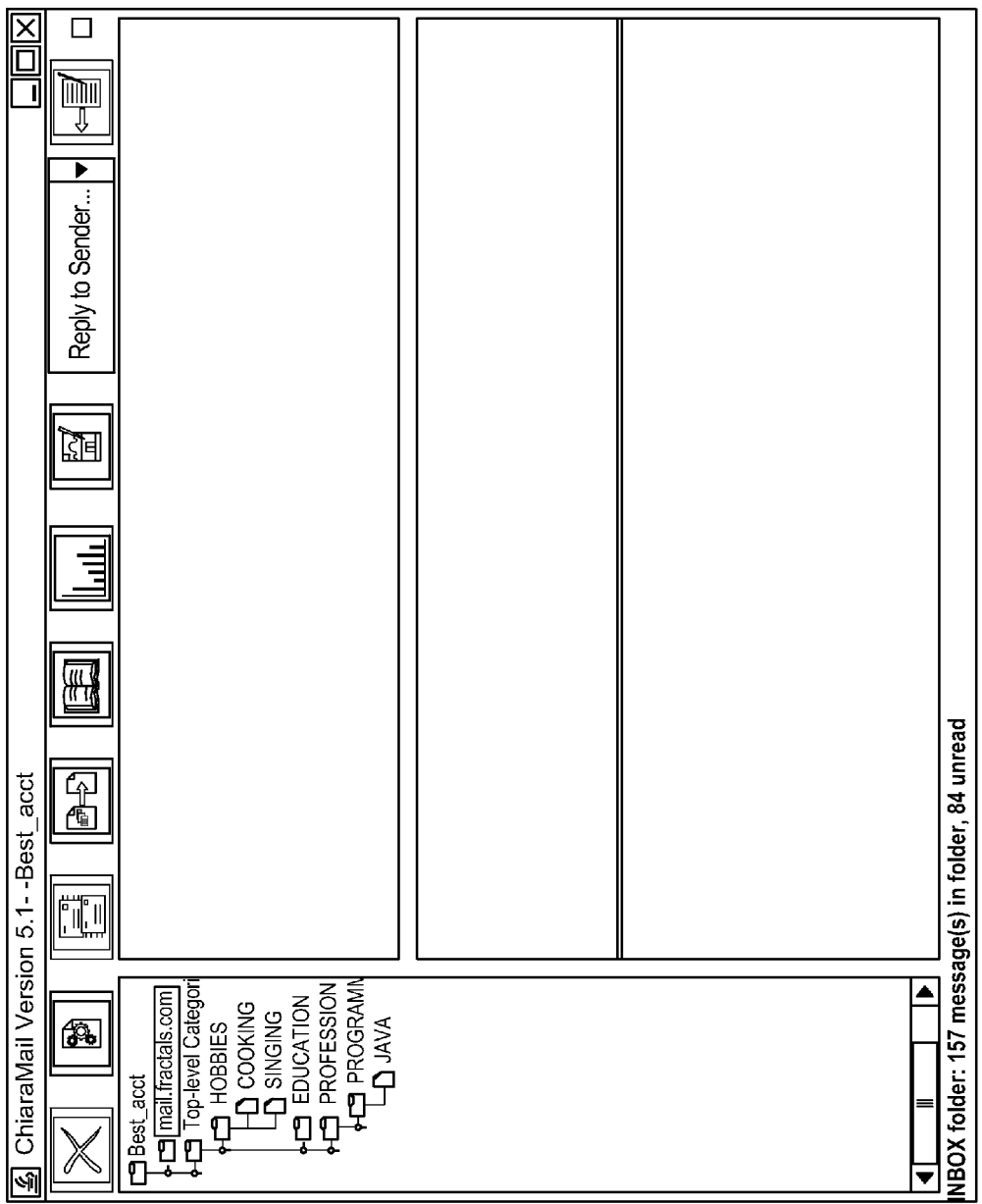
FIG. 12 is a screenshot showing the display after the user has removed the categories "HOBBIES: CHESS" and "HOBBIES: VIDEO GAMING" from the group named "filter_groups".

7. Edit the filter_groups group by selecting Move matches to category folders, save the changes and close the mail folder tree on the left-hand side of the window. The window should look something like in FIG. 8.
8. Open the folder tree named Top-level Categories (FIG. 9), followed by the subfolders Hobbies, Profession and Programmer (FIG. 10). Next, select the category labeled Chess. The mail client will show something like FIG. 11. The message headers displayed are those messages that include the category Hobbies: Chess, either embedded in the message header or defined to the server. In FIG. 11, there are four lines in the message header window. In the original color screenshot that is the basis of the black and white version of FIG. 11 that is presented in this patent application, the first line is rendered in green. The second line is rendered in dark blue. The third line is rendered in pale blue. And the fourth line is rendered in purple.
9. Finally, remove the categories Hobbies: Chess and Hobbies: Video Gaming from filter_groups and note that Chess has disappeared from the Hobbies category (FIG. 12).

Other implementations are possible which rely on techniques expressed in the preferred implementation, namely the following:

Usenet and other bulletin board-based networks, including blogs (Web logs). As with the preferred implementation, message senders may provide a set of categories to be assigned to each message that the sender sends and the message viewer may assign a set of category filters. The sender may also restrict who may filter on messages he sends, by specifying the viewer's e-mail address or handle (unique identifier). In the case of non-Usenet bulletin boards, the sender and viewer be identified by a handle, rather than e-mail address; the technique is easily adapted to this case. Message categories may be embedded in the message or kept on the category server.

Internet Relay Chat (IRC) and other interactive chat networks. In these networks, users interact in real time, rather than posting messages and later reading them at their leisure. As in bulletin board networks, the message sender and viewers (chat participants) may be identified via their respective handles. For this type of network, embedding categories in the message may not make sense; in such cases, the use of a category server may be required. Also, rather than displaying a message in the category tree, the user handle of the posting participant might be displayed.

Social networking sites. Typically, all participants in such networks interact on the site, after logging in, or via e-mail. In the former case, interaction is accomplished via the site's messaging system. Again, as in the above scenarios, the message senders and viewers are identified via unique handles, to be used as a reference for senders' and viewers' respective category groups. As in chat networks, embedding categories in the message may not make sense; in such cases, the use of a category server may be required. In social networks that make use of avatars, the avatars of the message sender, rather than or in addition to the messages sent by the sender, may provide the visual feedback in a way similar to the one described in the preferred implementation. Also, rather than displaying a message in the category tree, the user handle or avatar of the posting participant might be displayed.

What is claimed is:

1. A method comprising sending, by a messaging client, a configuration file to a category server, the configuration file comprising a list of category designations assignable to messages sent over a network by the messaging client;

assigning, by the messaging client, at least one category designation from the list of category designations to an outgoing message comprising an email prior to sending the outgoing message, with the at least one category designation stored in a database managed by the category server and not being contained within the outgoing message, the at least one category designation being accessible by a command sent by a recipient mail client program to the category server, and wherein the at least one category designation is configured to facilitate the recipient mail client to display an indication representing a number of matches associated with the at least one category designation assigned to the outgoing message, the messaging client including an avatar, the avatar imparting the message with information allowing a recipient of the outgoing message to receive visual feedback indicating exactly which of a set of recipient filters match which category designations associated with the message; and sending the outgoing message over the network; wherein:

the category server is independent of any server used to send the outgoing message and is also independent of the messaging client; and the at least one category designation representing attributes of the outgoing message or a sender of the outgoing message and being configured to facilitate a recipient mail client filter to filter the outgoing message based on the at least one category designation and to provide visual feedback associated with the at least one category designation, wherein the visual feedback includes an indication of the number of matches between the at least one category designation assigned to the outgoing message and at least one recipient category designation associated with the recipient mail client filter.

2. The method of claim 1 wherein the at least one category designation managed by the category server is not revealed publicly.

3. The method of claim 1 wherein the at least one category designation is embedded in the message.

4. The method of claim 3 wherein the messaging client controls which message recipients are allowed to filter one or more of the at least one category designations embedded in the outgoing message.

5. The method of claim 1 wherein assigning at least one category designation further comprises assigning at least one subcategory designation.

6. The method of claim 1 wherein assigning at least one category designation further comprises;

selecting a source of the at least one category designation, the source being selected from a predetermined list of category designations or a freeform category entry source;

when the predetermined list of category designations is the source selected, selecting a category designation from the predetermined list; and when the source is the freeform category entry source, accepting an input representation of the category designation unconstrained by an enumerated list of categories.

7. The method of claim 1 wherein the at least one category designation is further configured to facilitate the recipient mail client to receive filtering information and at least one category designation from the category server.

8. The method of claim 1 wherein the at least one category designation is further configured to facilitate recipient mail client to copy a message to at least one folder that is part of a folder hierarchy corresponding to a category designation.

9. The method of claim 1 further comprising the messaging client assigning additional category designations to the message.

10. The method of claim 9 wherein an additional category designation describes a geographic location of the messaging client.

11. The method of claim 9 wherein an additional category designation describes an attribute of the messaging client, said attribute being independent of the content of the message.

12. The method of claim 1 wherein the network is a bulletin board-based network.

13. The method of claim 1 wherein the network is an interactive chat network.

14. The method of claim 1 wherein the network is a Web-based social networking site.

15. The method of claim 1 wherein the at least one category designation is organized into a category group designation, which is assigned to all outgoing messages sent by the messaging client.

16. The method of claim 15 wherein the category group designation is selected from a predetermined list of category group designations.

17. The method of claim 16 further comprising the messaging client compiling the predetermined list of category group designations from one or more category group designations found in prior messages.

18. The method of claim 15 further comprising more than one messaging client that has access to every category designation and every category group designation.

19. The method of claim 15 wherein a category group designation of a first messaging client is independent from a category group designation of a second messaging client, where independence is present when category group designations are not constrained to be identical.

20. The method of claim 1 wherein the configuration file contains an access list containing information regarding which recipients are allowed to filter on which category designations.

21. The method of claim 1 wherein the category designations used by the messaging client for outgoing messages are different than category designations used by the messaging client for incoming messages.

22. The method of claim 1 wherein the at least one category designations are not limited to an enumerated list of category designations.

23. A computer program product comprising a non-transitory machine-readable medium storing instructions, which, when executed by at least one data processor, causes the at least one data processor to perform operations comprising:

sending, by a messaging client, a configuration file to a category server, the configuration file comprising a list of category designations assignable to messages sent over a network by the messaging client;

assigning, by the messaging client, at least one category designation from the list of category designations to an outgoing message comprising an email prior to sending the outgoing message, with the at least one category designation stored in a database managed by the category server and not being contained within the outgoing message, the at least one category designation being accessible by a command sent by a recipient mail client program to the category server, and wherein the at least one category designation is configured to facilitate the recipient mail client to display an indication representing a number of matches associated with the at least one category designation assigned to the outgoing message, the messaging client including an avatar, the avatar imparting the outgoing message with information allowing a recipient of the outgoing message to receive visual feedback indicating exactly which of a set of recipient filters match which category designations associated with the outgoing message; and sending, by the messaging client, the outgoing message over the network; wherein:

the category server is independent of any server used to send the outgoing message and is also independent of the messaging client; and the at least one category designation representing attributes of the outgoing message or a sender of the outgoing message and being configured to facilitate a recipient mail client filter to filter the outgoing message based on the at least one category designation and to provide visual feedback associated with the at least one category designation, wherein the visual feedback includes an indication of the number of matches between the at least one category designation assigned to the outgoing message and at least one recipient category designation associated with the recipient mail client filter.

24. The computer program product of claim 23, further comprising:

receiving an incoming message;

filtering the incoming message based on the at least one category designation and providing the visual feedback; and allowing for a change to the filter including adding or removing at least one category designation associated with the filter to change the visual feedback associated with the received incoming message.

25. The computer program product of claim 23, wherein the at least one category designation managed by the category server is not revealed publicly.

26. The computer program product of claim 23, wherein the at least one category designation is embedded in the outgoing message.

27. The computer program product of claim 23, wherein assigning the at least one category designation further comprises assigning at least one subcategory designation.

28. The computer program product of claim 23, wherein the at least one category designation is further configured to facilitate the recipient mail client to copy a message to at least one folder that is part of a folder hierarchy corresponding to a category designation.

29. The computer program product of claim 23, further comprising the messaging client assigning additional category designations to the outgoing message.

30. The computer program product of claim 29, wherein an additional category designation describes a geographic location of the messaging client.

31. The computer program product of claim 29, wherein an additional category designation describes an attribute of the messaging client, the attribute being independent of the content of the message.

32. The computer program product of claim 23, wherein the network is a bulletin board-based network.

33. The computer program product of claim 23, wherein the network is an interactive chat network.

34. The computer program product of claim 23, wherein the network is a Web-based social networking site.

35. The computer program product of claim 23, wherein the at least one category designation is organized into a category group designation, which is assigned to all outgoing messages sent by the messaging client.

36. The computer program product of claim 35, wherein the category group designation is selected from a predetermined list of category group designations.

37. The computer program product of claim 36, further comprising the messaging client compiling the predetermined list of category group designations from one or more category group designations found in prior messages.

38. The computer program product of claim 23, wherein the category server performs filtering, based on category designations provided by the recipient of the incoming message and contents of the configuration file.

39. The computer program product of claim 23, wherein the configuration file contains an access list containing information regarding which recipients are allowed to filter on which category designations.

40. The computer program product of claim 23, wherein:
receiving an incoming message;
filtering the incoming message according to one or more category designations; and
providing the visual feedback associated with the incoming message.

41. The computer program product of claim 23, wherein:
receiving an incoming message;
filtering the incoming message at the recipient mail client according to the recipient mail client; and
dynamically changing the recipient mail client filter for changing the visual feedback.

42. A non-transitory computer-readable storage medium storing one or more programs, the one or more programs having instructions that when executed by at least one programmable processor, cause the at least one programmable processor to perform operations comprising:

sending, by a messaging client, a configuration file to a category server, the configuration file comprising a list of category designations assignable to messages sent over a network by the messaging client;

assigning, by the messaging client, at least one category designation from the list of category designations to an outgoing message prior to sending the outgoing message, with the at least one category designation to be stored in a database managed by the category server and not being contained within the outgoing message, wherein the at least one category designation is configured to facilitate the recipient mail client to display an indication relating to the at least one category designation assigned to the outgoing message, the messaging client including an avatar, the avatar imparting the outgoing message with information configured to allow a recipient of the outgoing message to receive visual feedback indicating which of a set of recipient filters match which category designations associated with the outgoing message; and sending the outgoing message over the network;

wherein the at least one category designation represents at least one attribute of the outgoing message or a sender of the outgoing message and being configured to facilitate a recipient mail client filter to filter the outgoing message based on the at least one category designation and to provide visual feedback associated with the at least one category designation.

* * * * *